US006823504B1

(12) United States Patent
Sokolov

(10) Patent No.: US 6,823,504 B1
(45) Date of Patent: Nov. 23, 2004

(54) METHOD AND APPARATUS FOR INTERFACING A JAVASCRIPT INTERPRETER WITH LIBRARY OF HOST OBJECTS IMPLEMENTED IN JAVA

(75) Inventor: Stepan B. Sokolov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 556 days.

(21) Appl. No.: 09/714,050

(22) Filed: Nov. 15, 2000

(51) Int. Cl.[7] .................................................. G06F 9/45
(52) U.S. Cl. ..................................... 717/136; 717/146
(58) Field of Search ................................. 717/136–148

(56) References Cited

U.S. PATENT DOCUMENTS

| 5,920,720 A | * | 7/1999 | Toutonghi et al. ........... 717/148 |
| 6,065,024 A | * | 5/2000 | Renshaw ..................... 715/513 |
| 6,292,936 B1 | * | 9/2001 | Wang .......................... 717/115 |

OTHER PUBLICATIONS

"The IR to VMx86 Translation Module Specification" by Chris Lattner, Dec. 1999.*
"JDK 1.1.8 Documentation: Java Reflection", Sun Microsystems, 1998.*
"Take an in–depth look at the Java Reflection API", By Chuck McManis, JavaWorld (www.javaworld.com), Issue Sep. 1997.*
"The Principles of Computer Hardware, Third Edition" by Alan Clements, 2000.*
"Load–Time Structural Reflection in Java" by Shigeru Chiba, Jun. 2000.*
Eobert W. Husted, "All About Javascript," Netscape Communications Corp., 1999, 6 pages.
"ECMAScript Language Specification," ECMA, Standard ECMA–262, Jun. 1997, pp. 1–95.

* cited by examiner

*Primary Examiner*—Wei Y. Zhen
(74) *Attorney, Agent, or Firm*—Robert C. Kowert; Meyertons, Hood, Kivlin, Kowert & Goetzel, P.C.

(57) ABSTRACT

A JavaScript interpreter may be interfaced with a JavaScript library of host objects implemented in Java. A JavaScript program may be accessed and parsed, an intermediate representation of the program may be generated, and the intermediate representation may be executed by interfacing with the library of host objects. In one embodiment, the JavaScript program is embedded in HTML documents in a Web browser. The browser is programmed to intercept the JavaScript code and pass execution control to an interpreter engine implemented in Java. The interpreter engine may access the program's library of host objects through an interface to the library and execute the intermediate representation to produce the desired results as programmed in the original JavaScript source program. The implementation of the interface enables the implementation of the interpreter engine to be independent from the implementation of the library of host objects and independent from the implementation of the browser.

35 Claims, 5 Drawing Sheets

US 6,823,504 B1

METHOD AND APPARATUS FOR INTERFACING A JAVASCRIPT INTERPRETER WITH LIBRARY OF HOST OBJECTS IMPLEMENTED IN JAVA

BACKGROUND OF THE INVENTION

1. Field of the Invention

This invention relates to a method and apparatus for interpreting and executing JavaScript programs, such as JavaScript programs embedded in hypertext markup language ("HTML") documents. More particularly, embodiments of the present invention relate to a method and apparatus for a JavaScript interpreter written in Java. Specifically, a JavaScript interpreter may intercept JavaScript source code within HTML documents, parse and convert the JavaScript source code to a proprietary intermediate form represented by objects written in Java. The JavaScript interpreter may interface with JavaScript library objects to execute the intermediate representation equivalent of the original JavaScript source code.

2. Description of the Related Art

JavaScript is a Web scripting language developed by Netscape Communications Corporation. JavaScript was one of the first Web scripting languages and it remains one of the most popular today. (Please note that JAVA and JAVASCRIPT used herein are registered trademarks of Sun Microsystems, Inc.) JavaScript may be directly included in HTML documents. HTML is a language used to create Web documents. Referring now to FIG. 1, the JavaScript source code is typically embedded in HTML documents 110, by using a script tag, such as "<SCRIPT LANGUAGE=JavaScript>". A Web browser 120, such as Netscape Navigator, executes HTML documents containing JavaScript source code. Unlike compiled languages, JavaScript is an interpreted language. This means the Web browser executes each line of JavaScript as it comes to it. The ability to interpret and execute JavaScript source code has been provided in popular Web browsers, such as Netscape Navigator and Microsoft Internet Explorer. JavaScript programs run within a Web browser or other JavaScript-enabled applications to produce the desired results 130. The JavaScript language is regularly updated by Netscape. The most recent version of JavaScript is version 1.3.

Typical prior art Web browsers that support JavaScript are programmed in native code complied for a particular computer platform. However, it may be desirable to support JavaScript in a Web browser programmed in a platform-independent language such as Java. A Java-based Web browser may run on any computing platform under a Java Virtual Machine for the particular platform. However, Java-based programs typically execute more and may have a larger memory footprint that natively coded programs. Thus, adding JavaScript support to a Java-based browser may exacerbate speed and memory drawbacks. It may be desirable to overcome these drawbacks for a Java-based browser with JavaScript support, especially for use in embedded devices such as personal digital assistants (PDAs), wireless communication devices, such as cellular telephones, and other small consumer devices where computer processing speed and memory resources are at a premium. The present invention may provide a method and apparatus for interpreting and executing JavaScript source code embedded in HTML documents. The interpreter of the present invention may be written using the Java programming language. The present invention uses a smaller memory footprint than the prior art in interpreting and executing JavaScript programs. Furthermore, the architecture of the present invention may enable faster execution of JavaScript programs and enable the use of independent implementations of the interpreter, the Web browser and the JavaScript object library.

SUMMARY OF THE INVENTION

A method and apparatus is disclosed for interfacing a JavaScript interpreter with a JavaScript library of host objects implemented using the Java programming language. Specifically, a method and apparatus is disclosed for accessing a JavaScript program, parsing the program, generating an intermediate representation of the JavaScript program, and executing the intermediate representation by interfacing with the JavaScript library of host objects.

In the preferred embodiment of the present invention, the JavaScript program is embedded in HTML documents in an Internet Web browser. The Web browser is programmed to intercept the JavaScript code and pass execution control over the program to an interpreter engine developed using the Java programming language. The parsing component of the engine validates the JavaScript instructions. The validated instructions are converted by the code generator component of the engine into an intermediate representation equivalent in Java code. The interpreter engine accesses the program's library of host objects through an interface to the library and executes the intermediate representation to produce the desired results as programmed in the original JavaScript source program. The implementation of the interface enables the implementation of the interpreter engine to be independent from the implementation of the library of host objects and independent from the implementation of the Web browser. The library of host objects is also implemented using the Java programming language, where the host objects are derived from abstract Java classes. The host objects of the library contain fields and methods identified in the JavaScript source program. The interface dynamically updates the host objects of the library. The dynamic update capability of the interface is implemented using hash tables. Methods previously unknown to the library are stored in the hash tables in their original source code syntax. The present invention further contemplates information media that conveys software for implementing the method disclosed herein.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

A preferred embodiment of the present invention may be developed using the Java programming language as provided in the Java Development Kit (JDK), version 1.1.7 from Sun Microsystems.

Figure 1:
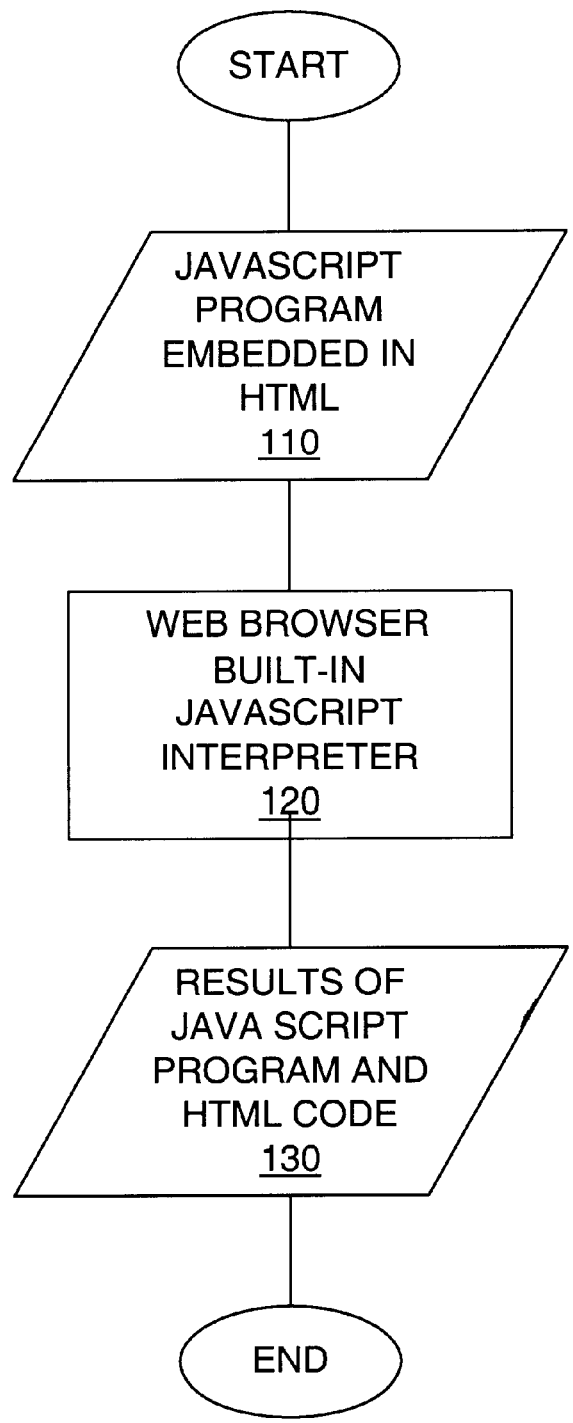
FIG. 1 is a flow diagram of a typical method of interpreting JavaScript programs.
Figure 2:
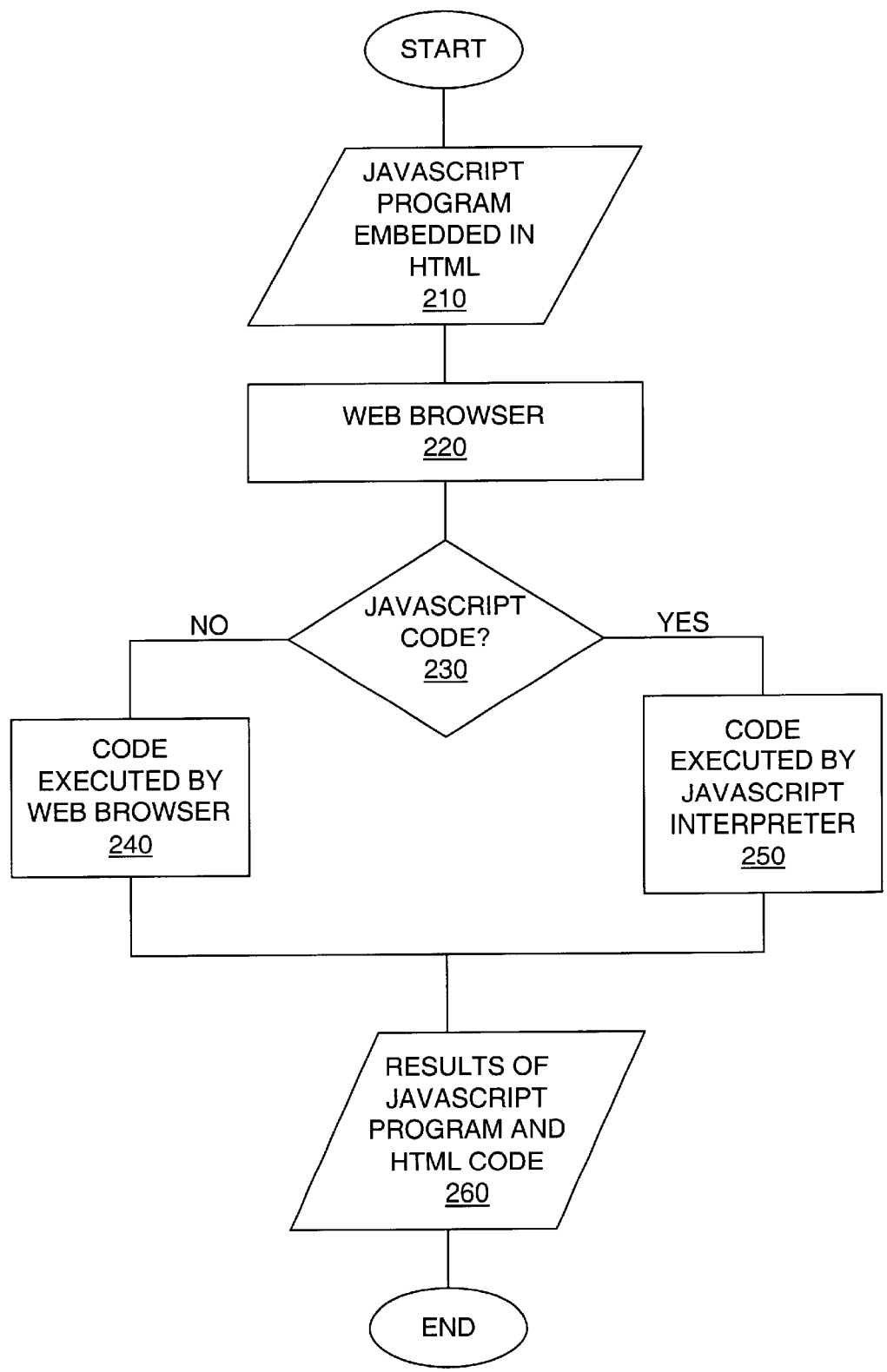
FIG. 2 is a flow diagram illustrating one embodiment of interception of JavaScript code in HTML for execution by a Java-based JavaScript interpreter.

Referring now to FIG. 2, in one embodiment, a JavaScript source program may be embedded in HTML 210. The HTML may be processed by a Web browser 220, such as Netscape Navigator or Microsoft Internet Explorer. A JavaScript tag in the HTML may be used to identify the beginning of the JavaScript code section within the HTML. Upon encountering a JavaScript tag 230, the Web browser may pass execution control to an interpreter engine 250. The interpreter engine 250 may interpret the JavaScript code 210, execute it, and present the results to the user 260. Non-JavaScript code in the HTML may be executed by the Web browser 240.

Figure 3:
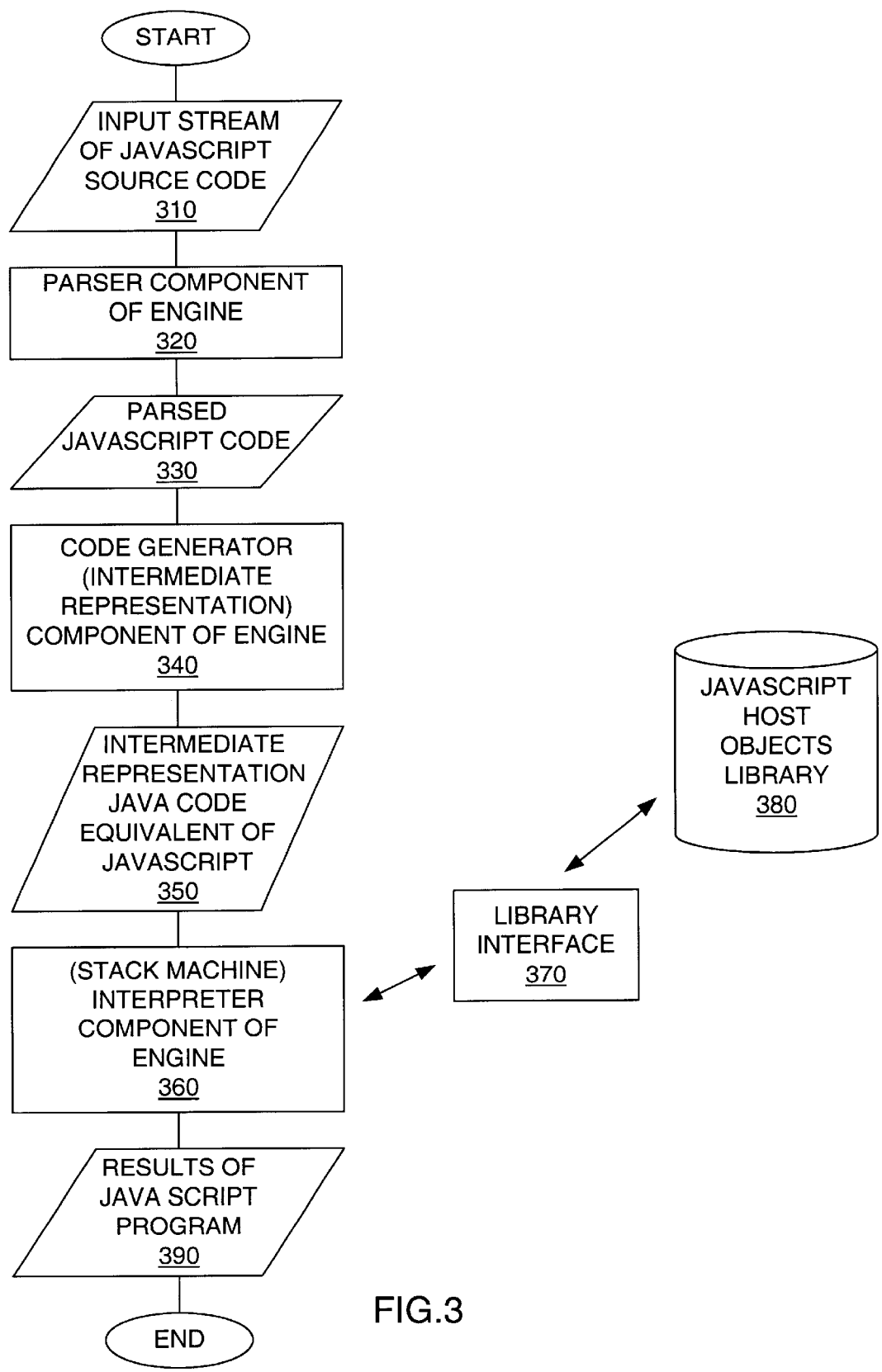
FIG. 3 is a flow diagram illustrating an embodiment of various components for interpreting JavaScript programs.

The interpreter engine 250 is further illustrated in FIG. 3, according to one embodiment. Once the Web browser has identified an input stream of JavaScript source code 310 in the HTML document, the Web browser may pass processing control to a parser component 320 of the interpreter engine. The parser 320 may examine the syntax of the incoming JavaScript source code 310 to produce a validated listing of JavaScript code 330 before the code is translated by the interpreter. The parsed JavaScript code 330 may then be processed by a representation generator component 340 of the interpreter engine. The representation generator component 340 takes as input the validated JavaScript code 330 and produces an intermediate representation using a proprietary Java code equivalent 350 of the JavaScript code 310. The intermediate Java code representation 350 may then be interpreted by an interpreter component 360. The interpreter component 360 may use a library interface 370 to communicate with a JavaScript host objects library 380 to execute the intermediate representation 350 and produce desired results 390 as programmed in the original JavaScript source program 310.

As one of ordinary skill in the art will appreciate, there are various methods by which a Web browser may be enabled to recognize the parser component 320 as the appropriate subroutine to which the Web browser passes control upon encountering the JavaScript tag 230. One method is by placing "hooks" into the Web browser which instruct the browser to call certain entry point methods of the parser component 320 when a JavaScript tag is encountered in the HTML code. The general method of placing such "hooks" in a Web browser by using the JDK Reflection API is well known to those of ordinary skill in the art. Other well-known methods of instructing one program to invoke another may be applied to instruct a Web browser to invoke the parser component 320. These methods include use of the "OnAction" keyword and "Form" tag.

In the preferred embodiment of the present invention, the parser component 320 may be written using Java CC, a publicly available utility published by Metamata. Using the Java CC utility, the parser component 320 may be written to accept the syntax (grammar) of the input language to be parsed, i.e., the JavaScript syntax. This enables the parser component 320 to parse the input steam of JavaScript source code 310 to ensure that the correct syntax is followed. The parser component 320 produces a validated listing of JavaScript code 330. The parser 320 may create Java objects based on what is parsed from the input stream of the JavaScript source code 310. The Java objects, which may contain field names and methods, may be stored using a technique such as hash tables. The use of hash tables may facilitate fast access of field names and methods during the entire process of interpreting and executing the JavaScript source code 310.

As stated above, a Java CC source file may define the JavaScript grammar in one embodiment. The following illustrates the creation of Java CC source file definitions and three related parser methods as used in the preferred embodiment of the present invention:

```
PARSER_BEGIN(JvScParser)
class JvScParser
{
static JvScCodeGenerator codeGen; . . .
boolean parseScript (int lineOffset) throws ParseException
{
    lineNumber = lineOffset;
    if(Script ( ) )
    {
        if (codeGen.lastPut ( ) == JvScOperator.OP_STMTEND)
            codeGen.unput ( );
            codeGen.put (JvscOperator.OP_EOF);
        return true;
    }
    return false;
    } . . .
} . . .
| < #LETTER: [ "A"–"Z", "a"–"z", "$" ] >
| < #DIGIT: [ "0"–"9" ] >
| < IDENTIFIER: <LETTER> (<LETTER> | <DIGIT>) * > . . .
boolean Script ( ) : { }
{
    ( <SEMICOLON> ) * Statement ( ) ( <SEMICOLON> ) *
        ( Statement ( ) ( <SEMICOLON> ) * ) * <EOF>
            { return true; }
|   <EOF>
        { return false; }
}
/*
This is a handler for the JavaScript statement.
It delegates code-generating duties to other handlers depending on the
current statement type.
*/
void Statement ( ) : { boolean nonEmpty; }
{
    nonEmpty = StatementBody ( )
        { if (nonEmpty)
            codeGen.put (JvScOperator.OP_STMTEND);
        }
|   Block (null, false)
|   SwitchStatement ( )
|   WhileStatement ( )
|   ForStatement ( )
|   DoStatement ( )
|   IfStatement ( )
|   FunctionDefinition ( )
        { codeGen.put (JvScOperator.OP_STMTEND); }
|       GlobalVarDef ( )
} . . .
/*
When a string of characters satisfying the pattern determined by
<DENTIFIER> (see above) has been encountered, it is used to create the
JavaScript engine internal representation of identifiers, JvScName.
'token.image' is where the string is stored by the parser.
*/
JvScName Name ( ) : { }
{
    <IDENTIFIER>
        { return new JvScName (token.image); }
}
```

Once the parser 320 has parsed the input stream of the JavaScript program 310, the parsed JavaScript code 330 may be translated into an intermediate representation Java code 350 by the representation generator component 340. The intermediate format of the preferred embodiment may be an arbitrary scheme that is similar to Java byte code. As one skilled in the art will appreciate, the intermediate format may be any scheme that adequately represents the input JavaScript code 310 for execution by a JavaScript interpreter. The representation or intermediate format 350 of the preferred embodiment is particularly suitable for execution by a stack-machine implemented interpreter written in Java. However, as one skilled in the art will readily appreciate, it is not required that the intermediate format 350 be designed such that it may be executed by stack-machine implemented interpreter. Depending on the representation scheme used, alternatively designed interpreters may be used without departing from the present invention.

Figure 4:
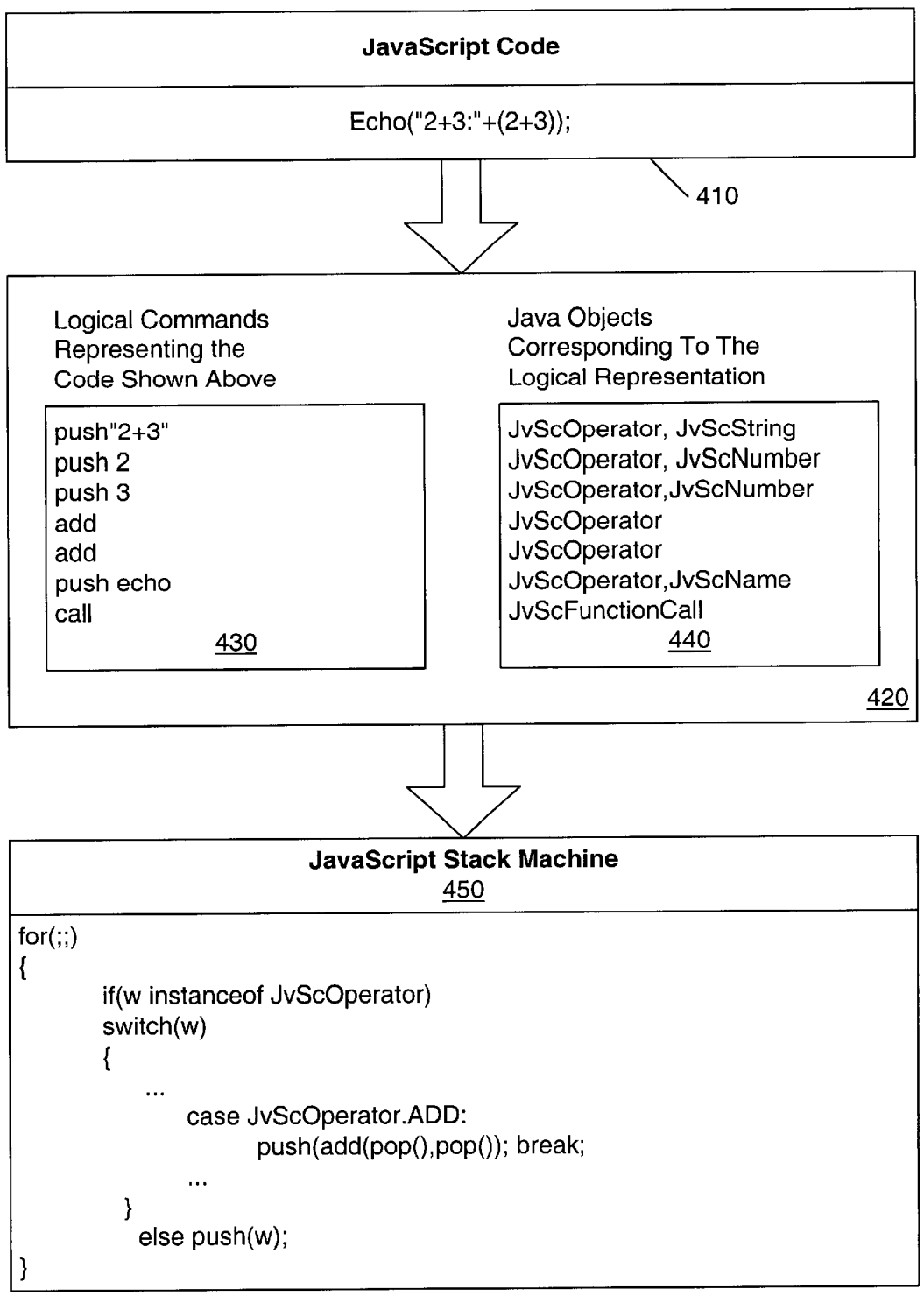
FIG. 4 illustrates a method according to one embodiment for converting JavaScript code to an equivalent intermediate representation.

As stated above, the representation of the input JavaScript program 310 may be accomplished using many different schemes. The preferred embodiment of the present invention demonstrates one representation scheme using Java classes and objects. Referring now to FIG. 4, a representation scheme example according to a preferred embodiment is illustrated. The input JavaScript source code sample 410 is "Echo("2+3:"+(2+));." The JavaScript code 410 performs the simple function of adding two numbers and displaying the result. Box 420 shows a representation of the JavaScript code 410 as it is accomplished in the preferred embodiment. More particularly, box 430 lists logical commands representing the JavaScript code 410, and box 440 lists Java objects and classes which correspond to the logical representations 430. Box 450 illustrates the foregoing with Java program code. The representation generator 340 may use a stack data structure to store the intermediate representation 350 as Java objects. For example, the JavaScript function "Echo" is represented with two pushes on the stack data structure. First, the logical command "call" is pushed on the stack to indicate the presence of a function or method. Second, the name of the function "echo" is pushed on the stack. The Java object "call" is an instance of the Java class JvScFunctionalCall. Similarly, the Java object "echo" is an instance of the Java class JvScName, used for storing host objects. The names of host objects may be names of methods or functions which are called to perform specific functions. And similarly, Java classes, such as JvScOperator, JvSc-String and JvScNumber may be created to hold Java objects, such as the operator "add," the string "2+3" and the integer "2" respectively. The parameters and commands in the intermediate representation may be Java objects.

Figure 5:
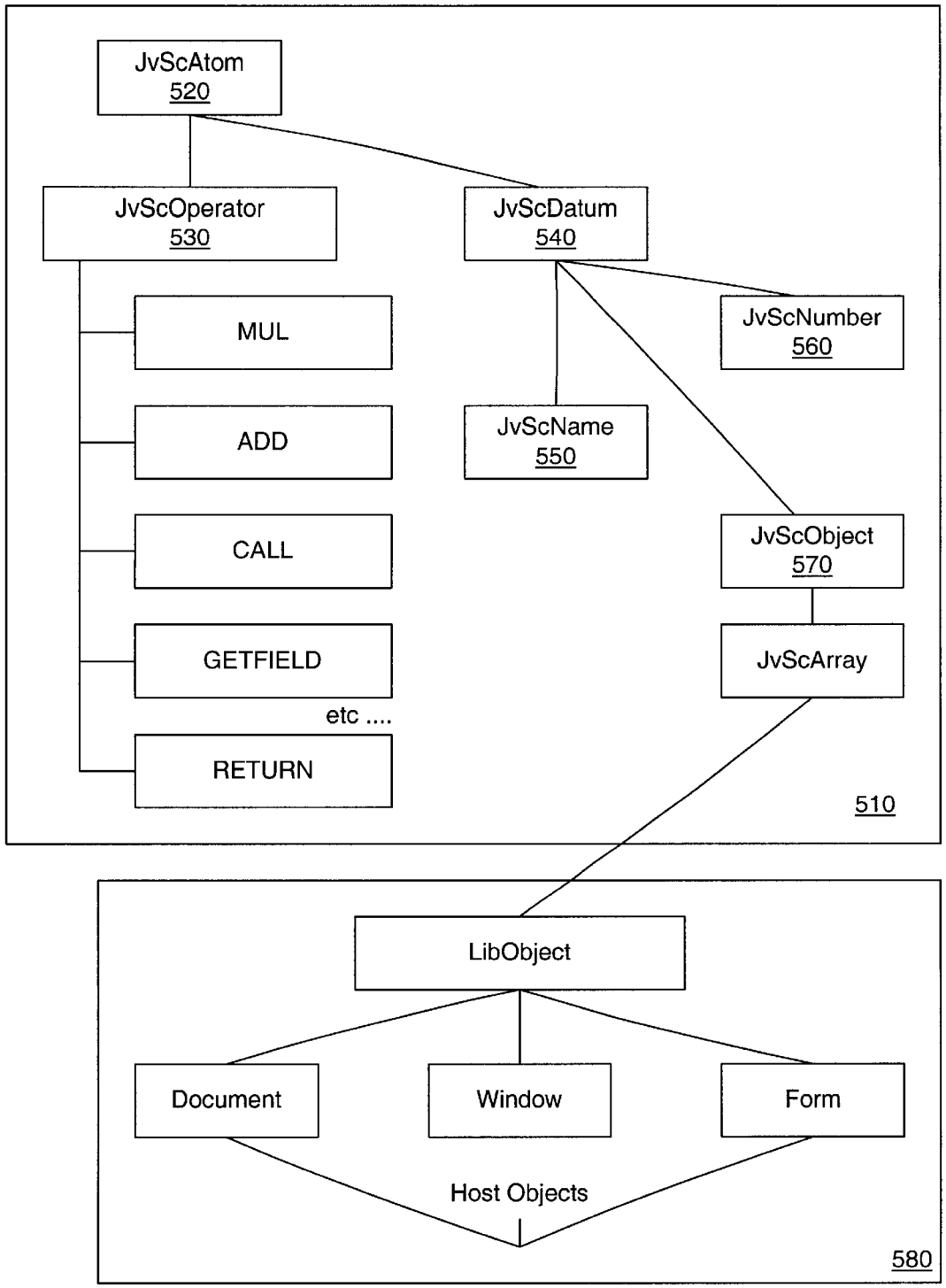
FIG. 5 illustrates the hierarchy of the JavaScript runtime objects and its relationship to the hierarchy of library objects, according to one embodiment.

Referring now to FIG. 5, box 510 illustrates a hierarchy of the JavaScript runtime objects and its relationship to a hierarchy of library objects 580. The class JvScAtom 520 may generally consist of a JvScOperator class 530 and the JvScDatum class 540. The JvScOperator class 530 may contain objects such as "MUL," "ADD," "CALL," "GET-FIELD" and "RETURN." The JvScDatum class 540 includes JvScName 550 (e.g., name of a method or function), JvScNumber 560 (e.g., the integer "2" used in an ADD operation) and JvScObject 570 (which is inserted in the stack data structure discussed above). As stated above, the representation generator 340 may use a stack data structure to store the intermediate representation 350 as Java objects.

The stack used in the representation scheme of the preferred embodiment may be an array of Java objects. Each element of this array (stack) may be either a command or a parameter. Each element may derive from an abstract Java class with very generic functionality and may contain data pertaining to the operator or data type it represents, sufficient for a stack machine interpreter to perform actions equivalent to those specified in the original JavaScript program 310. The Java class to which an object in the array (stack) belongs, may determine whether the particular object is a command or a parameter. As one of ordinary skill in the art will appreciate, there are numerous methods of representing in memory the operators and the operands of a compiled program. In the preferred embodiment of the present invention, the logical representation 430 uses the well-known Polish notation scheme.

The intermediate representation 350 may have several advantages, such as a small memory footprint. Furthermore, the representation scheme of the preferred embodiment may enable faster execution of the JavaScript code 310 by the interpreter component 360.

The following illustrates the representation generator component 340 of the preferred embodiment and an associated representation scheme suitable for execution by a stack-machine implemented interpreter:

```
void ForStatement ( ) : { }
    { <FOR> <LPAREN>ForRemainder ( ) }
void ForRemainder ( ) :
    { JvScScope scope = new JvScScope ( ) ;
      JvScName n = null; }
{
    LOOKAHEAD ( Name ( ) <IN> ) n = Name( ) <IN> { scope.addLocal (n.name); }
        ForInRemainder (scope, n)
  | LOOKAHEAD ( <VAR> Name ( ) <IN> ) <VAR> n = Name ( ) <IN>
        { scope.addLocal (n.name) ; } ForInRemainder (scope, n)
  | [ForInitList(scope)] <SEMICOLON>
        TraditionalForRemainder(scope)
}
void ForInitList (JvScScope scope) : { }
{
    { /*codeGen.put (scope); */ scope = insideFunction; }
  ( Expression( ) { codeGen.put(JvScOperator.OP_STMTEND); }
        (LOOKAHEAD(2) <COMMA> Expression( )
            { codeGen.put (JvScOperator.OP STMTEND); }
        )*
        ( <COMMA> LocalVarStatement (scope) )?
  | LocalVarStatement(scope)
  )
}
```

```
...
JvScAtom Literal( ) : { JvScArray a = null; }
{
    <INTEGER>
        {
        long num = 0;
        boolean tryDec = false;
        if (token.image.charAt(0) == '0' && token.image.length( ) > 1)
        {
            if(Character.toUpperCase (
                token.image.charAt (1)) == 'X')
                num = Long.parseLong (
                    token.image.substring(2), 16);
            else if(qualifyOctal (token.image)) {
                num = Long.parseLong (
                    token.image.substring (1), 8;)
            }
            else {
                tryDec = true;
                token.image = token.image.substring(1);
            }
        }
        else
            tryDec = true;
        if (tryDec)
        {
            try {
                num = Long.parseLong (token.image);
            }
            catch (NumberFormatException e) {
                // Most probably the number was too long
                return new JvScBigNumber(token.image);
            }
        }
        return new CacheNumber (num);
        }
|   <FLOAT>
        { return new
            CacheNumber ( (Double.valueOf (token.image)).
            DoubleValue ( ) );
        }
|   <STRING>
        { return new CacheString (
            token.image.substring (1, token.image.length ( ) -1)); }
|   <TRUE>
        { return JvScAtom.JvScTrue; }
|   <FALSE>
        { return JvScAtom.JvScFalse; }
|   <NULL>
        { return JvScAtom.JvScNull; }
|   <UNDEFINED>
        { return JvScAtom.JvScuUdefined; }
}
...
JvScOperator AssignOperator ( ) : { }
{
    <ASSIGN>            {return JvScOperator.OP_SET; }
|   <PLUS_ASSIGN>       {return JvScOperator.OP_ADD_SET; }
|   <MINUS_ASSIGN>      {return JvScOperator.OP_SUB_SET; }
|   <MUL_ASSIGN>        {return JvScOperator.OP_MUL_SET; }
|   <DIV_ASSIGN>        {return JvScOperator.OP_DIV_SET; }
|   <AND_ASSIGN>        {return JvScOperator.OP_AND_SET; }
|   <OR_ASSIGN>         {return JvScOperator.OP_OR_SET; }
|   <XOR_ASSIGN>        {return JvScOperator.OP_XOR_SET; }
|   <MOD_ASSIGN>        {return JvScOperator.OP_MOD_SET; }
|   <LSHIFT_ASSIGN>     {return JvScOperator.OP_LSH_SET; }
|   <RSHIFT_ASSIGN>     {return JvScOperator.OP_RSH_SET; }
|   <RUSHIFT_ASSIGN>    {return JvScOperator.OP_USH_SET; }
}
...
public class JvScAtom implements Cloneable
{
/* ECMAScript compatibility constants to be used by the typeof operator.
*/
static final String typeofUndefined    = "undefined";
static final String typeofObject       = "object";
static final String typeofNull         = typeofObject;
static final String typeofBoolean      = "boolean";
static final String typeofFunction     = "function";
```

-continued

```
static final String typeofNumber        = "number";
static public final JvScAtom JvScTrue        = new JvScObject( );
static public final JvScAtom JvScFalse       = new JvScObject( );
static public final JvScAtom JvScUndefined   = new JvScObject( );
static public final JvScAtom JvScNull        = new JvScObject( );
static public final JvScNumber JvScNaN       = new JvScNumber(DOuble.NaN);
static public final JvScAtom JvScLineNumber  = new JvScAtom( );
public   String typeOf( )
{
    if (this == JvScNull)
            return typeofNull;
        else if (this == JvScUndefined)
            return typeofUndefined;
        else if (this == JvScTrue || this == JvScFalse)
            return typeofBoolean;
        else if (this == JvScObject.NaN || this == JvScobject.Infinity)
            return typeofNumber;
    return typeofObject;
}
...
public class JvScNumber extends JvScAtom
{
    static final String NAN_STRING         ="NaN";
    static final int MAX_RADIX             = 36;
    static final String TYPEOF_NUMBER      = "number";
    static final String MAX_VALUE_STRING   = "1.7976931348623157e308";
    static final JvScNumber RADIX_10       = new JvScNumber(10);
    static final JvScNumber JvScZero       = new JvScNumber(0);
    static final JvScNumber JvScOne        = new JvScNumber(1);
    boolean integer;
    double value;
    public JvScNumber(int value)
        { this.value = value; integer = true; }
    public JvScNumber(long value)
        { this.value = value; integer = true; }
    public JvScNumber(float value)
        { this.value = value; integer = Math.floor(value) == value; }
    public JvScNumber(double value)
        { this.value = value; integer = Math.floor(value) == value; }
    public JvScNumber(double value, boolean integer)
        { this.value = value; this.integer = integer; }
    public JvScNumber(Number value)
        { this(value.doubleValue( )); }
    final public boolean isInteger( ) { return integer; }
    final public void set(int value) { this.value = value; integer = true; }
    finaJ public void set(long value) { this.value = value; integer = true; }
    final public void set(float value) { this.value = value; integer = false; }
    final public double get( ) { return value; }
    final public int intValue( ) { return (int)value; }
    final public long longValue( ) { return (long)value; }
    final public float floatValue( ) { return (float)value; }
    public double doubleValue( ) { return value; }
    public JvScAtom toNumber( ) { return this; }
    public JvScAtom toBoolean( )
    {
        return value == 0.0 || Double.isNaN(value)?
JvScFalse : JvScTrue;
}
public JvScAtom isFinite( )
        { return isFiniteboolean( )? JvScTrue : JvScFalse; }
public JvScAtom isNaN( )
            { return Double.isNaN(value)? JvScTrue: JvScFalse; }
boolean isNaNboolean( )
        { return Double.isNaN(value); }
boolean isFiniteboolean( )
{
        return !Double.isNaN(value)
            && value < Float.MAX_VALUE
            && value > -Float.MAX_VALUE;
}
static String trimSpaces(String str)
{
    inti = 0;
        for ( ; i < str.length( )
            && (Character.isWhitespace(str.charAt(i))
            || str.charAt(i) == '\u000b');
            1++);
    return i > 0?
            (i >= str.length( )? "" : str.substring(i)) :
```

-continued

```
            str;
}
static long parseInt(String inStr, int radix)
{
    int i = 0;
    String numstr = trimSpaces(inStr);
        if(numstr.charAt (i) == '-'
                || numstr.charAt (i) == '+'
                ||Character.digit(numstr.charAt(i), radix) >= 0)
        {
                for ( ++i;
                    i < numstr.length( )
                    && Character.digit(numstr.charAt(i), radix) >= 0;
                    i++);
        }
        return i < numstr.length( )?
            Long.parseLong(numstr.substring(0,i), radix) :
            Long.parseLong(numstr, radix);
}
static double parseFloat(String numstr)
{
    int i = 0;
    boolean dot = false;
            if(numstr.charAt(i) == '-'
                || numstr.charAt(i) == '+'
                || Character.digit(numstr.charAt(i), 10) >= 0)
            {
                for(++i;
                    i < numstr.length( )
                    && (Character.digit(numstr.charAt(i), 10) >= 0
                    || numstr.charAt(i) == '.' && (dot = !dot));
                    i++);
            }
    return Double.valueOf(
            i < numstr.length( )? numstr.substring(O,i) : numstr).
            doubleValue( );
}
public Object toJavaType( )
{
        if (integer)
                return new Long((long)value);
        else
                return new Double(value);
}
public final String toString(JvScAtcm radix) throws JavaScriptRuntimeException
{
    double r = radix.doubleValue( );
        if(Double.isNaN(value) || this == JvScNaN)
                return NAN_STRING;
        if ((int)r != 10)
        {
                if(Double.isNaN(r) || r <= 0 || r > MAX_RADIX)
                    throw new JavaScriptRuntimeException (
                        "Illegal radix: " + radix);
                return Long.toString(longvalue( ), (int)r);
        }
    return value >= Float.MAX_VALUE?
        MAX_VALUE_STRING : (integer? ""+longvalue( ): ""+(float)value);
}
public String toString( )
{
        try {
                return toString(RADIX_10);
        }
        catch(JavaScriptRuntimeException e) {
        }
    return NAN_STRING;
}
 public String typeOf( ) { return TYPEOF_NUMBER; }
}
...
public class JvScObject extends JvScAtom
{
 static final String CLS_ARRAY = "Array";
 static final String CLS_OBJECT = "Object";
 static final String CLS_NUMBER = "Number";
 static final String CLS_STRING = "String";
 static final String CLS_FUNCTION = "Function";
 static    final    String FLD_PROTOTYPE = "prototype";
```

-continued

```
static   final   String FLD_CONSTRUCTOR = "constructor";
static   final   String FLD_PROTO_= "_proto_";
static   final   String FLD_LENGTH = "length";
static   final   String FLD_TOSTRING = "toString";
static   final   Class[ ] voidClsList = new Class[0];
public static JvScAtom proto_       = new JvScObject( );
public static JvScAtom NaN          = JvScAtom.JvScNaN;
public static JvScAtom Infinity     = new JvScObject( );
private static Class STRING_CLASS = "".getClass( );
private static Class JVSCOBJECT_CLASS = proto_.getClass( );
static Class varParam[ ];
static {
        varParam = new Class[1];
        varParam[0] = (new JvScAtom[0]).getClass( );
}
static Hashtable methods = new Hashtable( );
static Hashtable constructors = new Hashtable( );
static Hashtable staticInstances = new Hashtable( );
// static Hashtable prototype = new Hashtable( );
protected Hashtable properties;
static private String objectPrefix = "[object";
private static String toStringClassName(JvScObject object)
{
    String clsName = null;
        /*
         * This function is completely meaningless
         * if not for ECMA, wouldn't ever be written.
         */
        if(object instanceof JvScPrototype)
             clsName = className(((JvScPrototype)object).getTargetClass( ));
        else if(object instanceof JvScNativeFunction)
             clsName = CLS_FUNCTION;
        else {
             /* Object m = object.properties.get(FLDTOSTRING);
             if (m != null && m instanceof JvScNativeFunction
                     && ((JvScNativeFunction)m).
                             className.compareTo(CLS_OBJECT) == 0)
             {
             }
             else try {
                  if(object.getClass( ).getDeclaredMethod(FLD_TOSTRING,
                                  voidClsList) != null)
                          return object.toString( );
             }
             catch(NoSuchMethodException e) { } */
             clsName = className(object.getClass( ));
        }
    return objectPrefix + clsName +"]";
}
static final String className(Class cls)
{
    String name = cls.getName( );
        return name.substring(name.lastIndexOf(" . ") + 1);
}
Public static JvScAtom fromJavaType(Object o)
{
        if(o instanceof java.lang.String)
             return new JvScString((java.lang.String)o);
        else if(o instanceof java.lang.Number)
             return new JvScNumber((java.lang.Number)o);
        return new JavaObject(o);
}
 static final JvScObject castToJvScObject(Object object)
 {
        return (JvScObject)(object instanceof JvScObject?
                object : new JavaObject(object));
}
 static JvScObject newInstance(Class cls, JvScAtom[ ] mem, int p1, int n)
        throws JavaScriptRuntimeException
           { return newInstance(cls, mem, p1, n, false); }
    static JvScObject newInstance(Class cls, JvScAtom[ ] mem,
            int p1, int n, booleanjavaClass)
throws JavaScriptRuntimeException
    {
        Constructor constructor[ ];
        JvScObject re = null;
           if(n <= 0)
           {
                try {
```

```
                re = castToJvScObject(cls.newInstance( ));
            }
            catch(Exception e) {
                throw new JavaScriptRuntimeException(
                    "EXCEPTION trying to invoke constructor of" +
                        cls + ":"+e);
            }
        }
        else {
            int i = 0;
            f((constructor=(Constructor[ ])constructors.get(cls)) == null)
                constructors.put(cls,
                    constructor = cls.getConstructors( ));
            for( i = 0; i < constructor.length &&
                constructor[i].getParameterTypes( ).length != n; i++);
            if(i >= constructor.length)
            {
               Constructor cnstr;
                    /*
                    * Try to find this(JvScAtom[ ] varp)
                    */
                    try {
                        cnstr = cls.getConstructor(varParam);
                    }
                    catch(Exception e) {
                      throw new JavaScriptRuntimeException(
                        "There is no constructor of class "" +
                        className(cls) + "\' accepting " +
                        n +" parameter(s) ");
                    }
                re = newInstance(cnstr, mem, p1, n);
            }
            else if (javaClass) {
                try {
                    return newJavaInstance(
                        constructor[i], mem, p1, n);
                }
                        catch(Exception e) {
                            throw new JavaScriptRuntimeException(
                                "Exception caught trying
                                instantiate '"
                                + cls + "\' ");
                        }
                }
                else try {
                    JvScAtom[ ] param = new JvScAtom[n];
                    System.arraycopy(mem, p1, param, 0, n);
                    re = (JvScObject)constructor[i].newInstance(param);
                }
                catch(Exception e) {
                        throw new JavaScriptRuntimeException(
                        "EXCEPTION trying to invoke constructor of "
+
                                    "class '" + className (cls) +
                                    "\': "+e);
                }
            }
    }
JvScPrototype proto = null;
try {
            proto =(JvScprototype)getStaticInstance(cls.getName( )).
                getField(FLD_PROTOTYPE);
}
catch(Exception e) {
            return re;
}
        if (proto != null)
            initFieldsFromPrototype(re, proto);
    return re;
}
static private JvScObject newjavaInstance(Constructor c, JvScAtom[ ] mem,
                int p1, int n) throws JavaScriptRuntimeException
{
        try {
            return new JavaObject(
                c.newInstance(JavaObject.atomsToObjects(mem, p1, n)));
        }
        catch(Exception e) {
            throw new JavaScriptRuntimeException(
                "Exception in constructor " + c + ":" +
```

-continued

```
                                    (e instanceof InvocationTargetException?
                                    ((InvocationTargetException)e).
                                    getTargetException( ).toString( ) : e.toString( )));
            }
    }
    static private JvScObject newInstance(Constructor c, JvScAtom[ ] mem,
                            int p1, int n) throws JavaScriptRuntimeException
    {
        Object[ ] p = new Object[1];
        JvScAtom[ ] param = new JvScAtom[n];
            System.arraycopy(mem, p1, param, 0, n);
            p [0] = param;
            try {
                    return castToJvScObject(c newInstance(p));
            }
            catch(Exception e) {
                    throw new JavaScriptRuntimeException(
                        "Exception in constructor" + c + ":" +
                                    (e instanceof InvocationTargetException?
                                    ((InvocationTargetException)e).
            getTargetException( ).toString( ) : e.toString( )) );
            }
    }
}
class JvScOperator extends JvScAtom
{
 static final byte ARITHM = 1;
 static final byte ASSIGN = 2;
 static final byte ACCESS = 3;
 static final byte LOGIC = 4;
 static final byte CONTRL = 5;
 static final byte INCDEC = 6;
 static final JvScOperator OP_NOP = new JvScOperator(0, "<nop>");
 static final JvScOperator OP_EOF = new JvScOperator(0, "<stop>");
 // return
 static final JvScOperator OP_RET = new JvScOperator(0, "<ret>");
 // return, unload
 static final JvScOperator OP_RETU = new JvScOperator(0, "<retu>");
 // return void
 static final JvScOperator OP_RETV = new JvScOperator(0, "<retv>");
 // return void, unload
 static final JvScOperator OP_RETVU = new JvScOperator(0, "<retvu>");
 // function definition
 static final JvScOperator OP_DEFUN = new JvScOperator(0, "<defun>");
 static final JvScOperator OP_BLKEND = new JvScOperator(0, "} <end>");
 static final JvScOperator OP_UNLOAD = new JvScOperator(0, "} <end-unload>");
 static final JvScOperator OP_POP = new JvScOperator(0, "<pop>");
 static final JvScOperator OP_STMTEND = OP_POP;
 static final JvScOperator OP_UNWITH = new JvScOperator(0, "<senza>");
 static final JvScOperator OP_WITH = new JvScOperator(1, "<con>");
 static final JvScOperator OP_TYPEOF = new JvScOperator(1, "<typeof>");
 static final JvScOperator OP_DELETE = new JvScOperator(1, "<delete>");
 static final JvScOperator OP_VOID = new JvScOperator(1, "<void>");
 // It's a special get-indices method used primarily
 // by the for(x in y) statement.
 static final JvScOperator OP_GET_INDX = new JvScOperator(1, "<indices>");
 static final JvScOperator OP_MINUS = new JvScOperator(1, "u-");
 static final JvScOperator OP_PLUS = new JvScOperator(1, "u+");
 static final JvScOperator OP_NEG = new JvScOperator(1, "~");
 static final JvScOperator OP_NOT = new JvScOperator(1, "!");
 static final JvScOperator Op_INCP = new JvScOperator(1, ".++", INCDEC);
 static final JvScOperator OP_DECP = new JvScOperator(1, ".--", INCDEC);
 static final JvScOperator OP_INC = new JvScOperator(1, "++.", INCDEC);
 static final JvScOperator OP_DEC = new JvScOperator(1, "--.", INCDEC);
 static final JvScOperator OP_DIV = new JvScOperator(2, "/", ARITHM);
 static final JvScOperator OP_MUL = new JvScOperator(2, "*", ARITHM);
 static final JvScOperator OP_MOD = new JvScOperator(2, "%", ARITHM);
 static final JvScOperator OP_ADD = new JvScOperator(2, "+", ARITHM);
 static final JvScOperator OP_SUB = new JvScOperator(2, "-", ARITHM);
 static final JvScOperator OP_RSH = new JvScOperator(2, ">>", ARITHM);
 static final JvScOperator OP_LSH = new JvScOperator(2, "<<", ARITHM);
 static final JvScOperator OP_USH = new JvScOperator(2, ">>>", ARITHM);
 static final JvScOperator OP_BIT_OR = new JvScOperator(2, "|", ARITHM);
 static final JvScOperator OP_BIT_XOR = new JvScOperator(2, " ", ARITHM);
 static final JvScOperator OP_BIT_AND = new JvScOperator(2, "&", ARITHM);
 static final JvScOperator OP_GT = new JvScOperator(2, ">", LOGIC);
 static final JvScOperator OP_LT = new JvScOperator(2, "<", LOGIC);
 static final JvScOperator OP_GE = new JvScOperator(2, ">=", LOGIC);
 static final JvScOperator OP_LE = new JvScOperator(2, "<=", LOGIC);
 static final JvScOperator OP_EQ = new JvScOperator(2, "==", LOGIC);
```

-continued

```
static final JvScOperator OP_NE = new JvScOperator(2, "!=", LOGIC);
static final JvScOperator OP_SET = new JvScOperator(2, "=", ASSIGN);
static final JvScOperator OP_ADD_SET = new JvScOperator(2, "+=", ASSIGN);
static final JvScOperator OP_SUB_SET = new JvScOperator(2, "-=", ASSIGN);
static final JvScOperator OP_MUL_SET = new JvScOperator(2, "*=", ASSIGN);
static final JvScOperator OP_DIV_SET = new JvScOperator(2, "/=", ASSIGN);
static final JvScOperator OP_MOD_SET = new JvScOperator(2, "%=", ASSIGN);
static final JvScOperator OP_AND_SET = new JvScOperator(2, "&=", ASSIGN);
static final JvScOperator OP_XOR_SET = new JvScOperator(2, "^=", ASSIGN);
static final JvScOperator OP_OR_SET = new JvScOperator(2, "|=", ASSIGN);
static final JvScOperator OP RSH SET = new JvScOperator(2, ">>=", ASSIGN);
static final JvScOperator OP LSH SET = new JvScOperator(2, "<<=", ASSIGN);
static final JvScOperator OP USH SET =new JvScOperator(2, ">>>=", ASSIGN);
/* Access Operations */
static final JvScOperator OP_ACS_ARR = new JvScOperator(2, "[ ]", ACCESS);
static final JvScOperator OPACS_OBJ = new JvScOperator(2, "->", ACCESS);
static final JvScOperator OP_FUN_CALL = new JvScOperator(-1, "<call>");
static final JvScOperator OP_NEW = new JvScOperator(-1, "<new>");
byte opArity;
byte type;
String opSign;
JvScOperator(byte opArity, String opSign)
        { this.opArity = opArity; this.opSign = opsign; }
JvScOperator(int opArity, String opSign)
        { this(opArity, opsign, CONTRL); }
JvScOperator(int opArity, String opSign, byte type)
        { this((byte)opArity, opSign); this.type = type; }
public String toString( )
        { return opSign; }
}
        if    (image == null)
            image = new StringBuffer(new String(input_stream.GetSuffix(jjimageLe
n + (lengthofMatch = jjmatchedPos + 1))));
        else
            image.append(new String(input_stream.GetSuffix(jjimageLen + (lengthOfMatch =
jjmatchedPos + 1))));
            ++JvScParser.lineNumber;
          break;
        default:
          break;
    }
}
}
}
```

Once the representation generator 340 has translated the parsed JavaScript code 330 to produce the intermediate representation 350, the interpreter component 360 may use the library interface 370 to communicate with the JavaScript host objects library 380 to execute the intermediate representation 350 and produce the desired results 390, as programmed in the original JavaScript source program 310.

The interpreter 360 may pop elements off the stack, executes them and places the result back on the stack. The interpreter may execute streams of Java objects (e.g., "push" and "2+3") in the stack containing commands and parameters belonging to various Java classes (e.g., JvScOperator or JvScString). The interpreter may pop one or more elements off the stack depending on what instruction is being executed. For example, if an "ADD" operator is encountered, then the interpreter knows that it must pop two more elements which will form the operands for the "ADD" operation. The following illustrates the execution of the intermediate representation Java code 350 by the interpreter 360, according to one embodiment:

```
public class StackMachine
{
...
private JvScAtom executeScript (JvScAtom[ ] word,
        int start, JvScBrowseContext bc)
            throws JavaScriptRuntimeException
{
        if (bc != null)
            initContext(browseContext = bc);
...
        for ( pc = start; ; pc++)
        {
          if ( (w=word[pc] ) instanceof JvScOperator)
          {
            ...
            case JvScOperator.ARITH : arithmetic(w, n, n2) ; break;
```

-continued

```
        }
        else
            stack [++sp] = w;
    }
}
private JvScAtom arithmetic (JvScAtom w, JvScNumber n, JvScNumber n2)
        throws JavaScriptRuntimeException
{
        if (w == JvScOperator.OP_ADD || w == JvScOperator.OP_ADD_SET)
            shadowNumber [sp - 1]. value = n.value + n2.value;
        if (w == JvScOperator.OP_SUB || w == JvScOperator.OP_SUB_SET)
            shadowNumber [sp - 1]. value = n.value - n2.value;
        // etc., . . .
        return stack [sp - 1] = shadowNumber [sp - 1];
}
```

Referring to FIG. 3, the interpreter component 360 may use the library interface 370 to communicate with the JavaScript host objects library 380 to execute the intermediate representation 350. In a JavaScript program execution environment, there may be several functionally independent components. The JavaScript interpreter and the JavaScript library are two of the most important components. In a preferred embodiment, the JavaScript program execution environment may be implemented using the Java programming language. The preferred embodiment may provide a mechanism whereby host objects in a JavaScript library are accessible to the interpreter in an execution environment designed in Java.

The method and system of the preferred embodiment may provide an interface 370 between the JavaScript interpreter 360 and the JavaScript library objects 380, where both the interpreter 360 and the library objects 380 are written in Java. The interface 370 enables the implementation of the interpreter 360 to be independent of the implementation of the library objects 380. Furthermore, the implementation of the interpreter 360 may be independent of the HTML browser 220 in which it runs. The foregoing relationship between the interpreter, the library objects and the browser may make it possible to easily incorporate the interpreter in any Java-enabled browser with an arbitrary library objects implementation.

Still referring to FIG. 3, the library objects 380 may be derived from abstract Java classes. The interpreter 360 may use the JDK Reflection API for at least two purposes. First, the Reflection API may enable the interpreter 360 to access specific information (such as properties) about known objects and classes in the library 380. Such information may include, for example, the availability of particular fields and methods within objects. Second, the Reflection API may enable the interpreter 360 to execute methods if they are not privately protected. The interface 370 may also enable manipulation of field values and call methods of an object. Additionally, fields and methods may be dynamically added or deleted in a class or object. The techniques of hash tables and the JDK Reflection API may be utilized to facilitate the foregoing processing.

One JavaScript standards specification requires five basic host objects that must be present in the local library of a JavaScript interpreter. All other objects that are called by a JavaScript program must be available in other libraries accessible to the JavaScript interpreter. The programmer of the JavaScript source code must know what objects, other than the five basic host objects, are accessible to the interpreter which will execute the JavaScript source code. The Web browser in which the JavaScript program runs may provide additional non-required host objects in its libraries. As one of ordinary skill in the art will appreciate, new fields and methods may be added or deleted to any object during run time.

As defined by a JavaScript standards specification, an object in JavaScript does not necessarily only bear traces of the class to which it belongs. The JavaScript object may have characteristics that are different from other objects belonging to the same class. Thus, objects in JavaScript may act as independent entities with methods and fields which may be different from the methods and fields in other objects belonging to the same class. However, objects in the same class may have certain basic methods and fields in common.

Still referring to FIG. 3, during the processing of the JavaScript source code 310 in the preferred embodiment, the interpreter encounters fields and methods in the JavaScript program. The interpreter may create Java objects in a library containing the fields and the methods. However, as the input stream of JavaScript source code is processed, the interpreter may learn more information about fields and methods which it has previously encountered. The library interface 370 may provide the interpreter 360 the dynamic capability to update Java objects and their related properties or attributes.

In an embodiment, the library interface 370 may have three primary Java methods through which any interaction with an object 380 is carried out. The three primary Java methods may be "get field," "set field" and "invoke method." These methods may be used in conjunction with JavaScript objects and classes whose methods and fields are known to the JavaScript library 380, but not known to the interpreter 360. The Reflection API may be used to access the JavaScript library 380 and thus inform the interpreter 360 about methods and fields contained in any particular object.

The JavaScript library 380 may contain a static set of predefined objects containing methods and fields. In one embodiment, all objects within the input stream of JavaScript source code 310 must exist in the JavaScript library 380. However, certain objects within the JavaScript source code 310 may contain methods and fields which are not known to the JavaScript library 380. When this occurs, the JavaScript library 380 may be dynamically updated with the new methods and fields. Similarly, the interpreter 360 may need to be aware of the new methods and fields. The dynamic update of the library 380 may be accomplished with the use of hash tables. In a preferred embodiment, the JavaScript library 380 may include a hash table for each object. Initially, the hash table for each object may be empty.

When the input JavaScript program 310 introduces a new method or field, an entry may be created in the hash table corresponding to the new method or field. The name of the new method or field may be used as the key to the hash table entry. The key serves as the means by which the new method or field may be accessed to acquire information about the method or field. For methods, the information to be accessed may be the code section associated with the new method, and for fields, the information to be accessed may be the data holder or the field value. The interpreter 360 may access the hash tables to get values of the new fields and to execute the code associated with the new methods.

The newly added fields and methods in the hash tables may remain available to all JavaScript program and interpreter invocations so long as the current session of the HTML browser 220 is running. Once the HTML browser 220 is closed, the newly updated methods and fields in the hash tables may be lost and therefore, the methods and fields may not be available to future JavaScript program and interpreter invocations in a subsequent session of the HTML browser. The clearing of the new methods and fields in the hash tables at the end of an HTML browser session may be done pursuant to a JavaScript standards specification.

In the preferred embodiment the source code associated with the newly added methods is not compiled when a reference to it is stored in the hash table. Instead, an intermediate representation is stored within the engine. This technique may solve certain problems encountered by the prior art. Some prior art methods compile the source code associated with the newly added methods and store the new source code in object code format for future use. The prior art technique is not efficient because it uses large amounts of memory to store the compiled object code and uses valuable processing time to convert the source code to object code. In the present invention, these problems may be overcome by storing an intermediate representation of the original JavaScript syntax.

The present invention does not require that the library host objects 380 (and their associated methods) be written in Java. The objects and methods may be native code but the entry point is written in Java, in a preferred embodiment, because in the preferred embodiment the interpreter 360 may require methods to have a Java entry point so that the interpreter 360 can call on such routines.

One desirable attribute of the present invention may be the independence and interchangeability of the JavaScript library 380. The preferred embodiment may include one implementation of the JavaScript library 380. This implementation may be written in Java based on a JavaScript standards specification. The JavaScript library 380 may be independent of the interpreter 360. Therefore, any other implementation of the JavaScript library 380 may be easily substituted for the library used in the preferred embodiment. As mentioned previously, both the interpreter and the JavaScript library may also be independent of the HTML browser. The independence and interchangeability of the JavaScript library may permit customization of the library to different environments, such as through the addition of objects, and their corresponding methods and fields, that may be better suited to certain HTML browsers.

The following illustrates how the interpreter component 360 may use the library interface 370 to communicate with the JavaScript host objects library 380 to execute the intermediate representation 350, according to one embodiment:

```
public abstract class LibObject extends JvScObject
{
private static JvScBrowseContext context = null;
public static void setContext(JvScBrowseContext contxt) {context = contxt;}
public static JvScBrowserContext getContext( ) {return context:}
protected JvScAtom getField(java.lang.String name) throws JavaScriptRuntimeException
{
    java.lang.String s = "get_" + name;
        try {m = getClass( ),getMethod(s, null);}
        catch(Exception e) {m = null;}
        if (m != null)
        {
            try {return (JaScAtom) (m.invoke(this, null) );}
            catch (Exception e) {     // fall back}
        }
        return super.getField(name);
}
protected JvScAtom setField(java.lang.String name, JvScAtom value)
        throws JavaScriptRuntimeException
{
        java.lang.String s = "set_" + name;
        JvScAtom[ ] args = new JvScAtom[1];
        args [0] = value;
            try {
                // this uses the Reflection API to find the field whose name is specified by
                // 'name'. The value of s specifies what method should be called to set the
                // field.
                return invokeMethod(s, args, 0, 1);
            }
            catch(Exception e) { // just fall back }
        return super.setField(name, value);
}
}
class JvScObject extends JvScAtom
{
    protected JvScAtom getField(String name) throws JavaScriptRuntimeException
    {
```

-continued

```
            JvScAtom val = properties == null? null : (JvScAtom)properties.get(name);
                If(val == null)
                {
                    // Reflection is being used:
                    try {
                        return (JvScAtom) this.
                            getClass( ).getField(name).get(this);
                    }
                    catch(NoSuchFiledException e) {
...
                    }
                }
        }
        /* How methods of JavaScript (host) objects are invoked: */
        protected JvScAtom invokeMethod(String name, JvScAtom mem[ ], int p1, int n)
                    throws JavaScriptRuntimeException
        {
            /* An attempt to access a user-defined method */
            if (properties != null)
                try {
                    JvScFunction f =
                        /* Try to cast it to JvScFunction. If we are not caught into an
                         * exception, it's really a function. */
                        (JvScFunction)properties.get(name);
                    if(f != null)
                    {
                            if(! (f instanceof JvScMethod))
                                properties.put(name, f=new JvScMethod (this, f) );
                        return (JvScAtom) f;
                    }
                }
            catchException e) {
                System.out.println (name + " is a field, not method : "
                        + properties.get (name) );
            }
            int i;
            JvScAtom[ ] param;
            Method method[ ] = null;
            If ( (method = (Method[ ])methods.get (this.getCalss( ) ) ) == null)
                methods.put(this.getClass( )
            for ( i = 0; i < method.length
                && (method[i].getName( ) compareTo (name) != 0
                || method[i].getParameterTypes ( ).length != n
                || (n > 0 && method[i].getParameterTypes ( ) [0] == varParam[0] ) );
                i++);
            if (i >= method.length)
            {
              Method m;
                /* Try to find method (JvScAtom[ ] varp) */
                try {
                    m = this.getClass ( ) getMethod (name, varParam);
                }
                catch (Exception e) (
                    throw new JavaScriptRuntimeException(
                        "There is no method '" +
                        className (this.getClass ( ) ) + "." +
                        name + "( )\ accepting " + n +
                        " parameter(s). ",
                        JavaScriptRuntimeException.NO_SUCH_METHOD
                    );
                return invokeMethod(m, mem, p1, n);
            }
            try {
                    if(n > 0)
                    {
                        param = new JvScAtom[n];
                        System.arraycopy (mem, p1, param, 0, n);
                    }
                    return (JvScAtom)method[i].invoke(this, param);
            }
            catch (Exception e) {
                if (e instanceof InvocationTargetException)
                {
                        if ( ( (InvocationTargetException)e).getTargetException ( )
                            instanceof JavaScriptRuntimeException)
                            throw (JavaSCriptRuntimeException)
                                    ((InvocationTargetException)e).
                                    getTargetException( );
                }
```

```
                throw new JavaScriptRuntimeException (
                    "EXCEPTION caught while trying to invoke method'" +
                    name +"'; " +
                    (e instanceof InvocationTargetException?
                    ((InvocationTargetException)e).
                    getTargetException( ).toString( ) : e.toString( ) )
                );
        }
}
{
protected JvScAtom invokeMethod (Method method, JvScAtom mem[ ], int p1, int n)
        throws JavaScriptRuntimeException
{
    Object[ ] p = new Object[1];
    JvScAtom[ ] param = new JvScAtom[n];
    System.arraycopy(mem, p1, 0, n);
P[0] = param;
try {
    Return (JvScAtom)method.invoke(this, p);
}
catchException e) {
    throw new JavaScriptRuntimeException (
        "Exception in method " + method + ": " +
        (e instance of InvocationTargetException?
        ((InvocationTargetException)e).
        getTargetException( ).toString( ) : e.toString( ) )
        );
    }
}
...
}
static final void initFieldsFromPrototype(JvScObject o, JvScPrototype proto) throws
JavaScriptRuntimeException
{
    Object key;
        for(Enumeration e = proto.properties.keys( ); e.hasMoreElements( ); )
        {
            key = e.nextElement( );
            o.setField(key.toString( ),
                (JvScAtom)proto.properties.get(key));
        }
}
public JvScAtom eval(JvScAtom code)
{
    return null;
}
public void setproperty(String name, JvScAtom value)
{
    if (properties == null)
            properties = new Hashtable( );
        properties.put(name, value);
}
protected JvScAtom setField(String name, JvScAtom val)
            throws JavaScriptRuntimeException
{
        if(name.compareTo(FLD PROTOTYPE) == 0)
            return val;
        if(properties == null || properties.get(name) == null)
        {
            /*
            * If there is no user defined field under
            * this name, maybe there is the real field.
            */
            try {
                this.getClass( ).getField(name).set(this, val);
                return val;
            }
            catch(IllegalAccessException ie) {
                /* that means the field is final or non-public.
                * In any case ignore this assignment.
                */
                return val;
            }
            catch(Exception e) {
                if(!(e instanceof NoSuchFieldException))
                    throw new JavaScriptRuntimeException(
                        "Access error: " + this.getClass( ) +
                        "cannot set '"' name + "\':" + e
                    );
            }
```

-continued

```
        }
        /*
         * Access the user-defined properties table
         */
        setProperty(name, val);
    return val;
}
public JvScAtom getProperty(String name)
    { return properties == null? null : (JvScAtom)properties.get(name);}
private Exception savedException;
protected JvScAtom getField(String name) throws JavaScriptRuntimeException
    {
    JvScAtom val = properties == null? null : (JvScAtom)properties.get(name);
        if(val == null)
        {
            try {
                    return (JvScAtom)this.
                        getClass( ).getField(name).get(this);
            }
            catch(NoSuchFieldException e) {
            try {
                    return new JvScNativeFunction(
                        this.getClass( ).getName( ),
                        this.getClass( ).getMethod(name,
                        null)
            }
            catch(Exception ex) { savedException = ex; }
            }
            catch(Exception ex2) { saveClException = ex2; }
            throw new JavaScriptRuntimeException("Access error:" +
                "cannot get field '" +
                className(this.getClass( )) +
                "." + name + "\':" + saveException );
    }
    return val;
}
boolean hasMethod(String name)
{
        if (properties != null)
                if(properties.get(name) != null)
                    return true;
        Method method[ ] = (Method[ ])methods.get(this.getClass( ));
        if (method != null)
                for( int i=0; i <method.length; i++)
                    if (method [i].getName( ).compareTo(name) == 0)
                        return true;
    return false;
}
protected JvScAtom invokeMethod(String name, JvScAtom mem[ ], int p1, int n)
            throws JavaScriptRuntimeException
```

Although the forgoing description has focused on Java implementations, other similar programming languages may be used as well. Any of the foregoing embodiments may be implemented by programming a suitable general-purpose machine having appropriate hardware. The machine may comprise a single computer or computing device. Alternatively, the machine may comprise a plurality of computers or computing devices connected by a communications link.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:

detecting one or more script language instructions in a document;

generating a platform-independent programming language representation of the one or more script language instructions, wherein the platform-independent programming language representation of the one or more script language instructions is different from the script language; and interpreting and executing each of one or more instructions of the platform-independent programming language representation, wherein said interpreting and executing comprises:

interfacing with an object library comprising a plurality of program objects; and accessing one or more of the plurality of program objects, wherein the one or more accessed program objects are used to implement the one or more instructions of the platform-independent programming language representation;

wherein said interpreting and executing produces results in accordance with the original one or more script language instructions.

2. The method as recited in claim 1, wherein said detecting is performed by a Web browser, and wherein said generating, said interpreting and executing, and said interfacing with an object library are performed by an interpreter engine.

3. The method as recited in claim 2, wherein the interpreter engine interfaces with the object library through an object library interface external to the Web browser and the interpreter engine.

4. The method as recited in claim 2, wherein the one or more instructions of the platform-independent programming language representation are stored in a stack data structure, wherein the interpreter engine is a stack-machine interpreter engine that pops the one or more instructions off the stack data structure during said interpreting and executing.

5. The method as recited in claim 1, wherein said generating a platform-independent programming language representation of the one or more script language instructions comprises validating that the one or more script language instructions conform to script language syntax.

6. The method as recited in claim 1, wherein said generating a platform-independent programming language representation of the one or more script language instructions comprises modifying a first of the one or more program objects.

7. The method as recited in claim 6, wherein said modifying the first program object comprises adding at least one of methods and fields to the first program object.

8. The method as recited in claim 1, wherein the script language is JavaScript.

9. The method as recited in claim 1, wherein the document is a markup language document.

10. The method as recited in claim 9, wherein the markup language is Hypertext Markup Language (HTML).

11. The method as recited in claim 1, wherein said detecting is performed by a Java-based Web browser executing within a Java Virtual Machine.

12. The method as recited in claim 1, wherein the platform-independent programming language is the Java programming language.

13. The method as recited in claim 1, wherein the plurality of program objects includes Java programming language objects.

14. A system, comprising:

a processor;

a memory coupled to said processor and operable to store program instructions; and an object library comprising a plurality of program objects;

wherein the program instructions are executable by the processor to execute a script comprising one or more script language instructions;

wherein, in said executing the script, the program instructions are further executable by the processor to:
generate a platform-independent programming language representation of the script, wherein the platform-independent programming language representation of the one or more script language instructions is different from the script language; and interpret and execute each of one or more instructions of the platform-independent programming language representation;

wherein, in said interpreting and executing, the program instructions are further executable by the processor to:
interface with the object library to access one or more of the plurality of program objects, wherein the one or more accessed program objects are used to implement the one or more instructions of the platform-independent programming language representation; and wherein said interpreting and executing produces results in accordance with the original one or more script language instructions.

15. The system as recited in claim 14, wherein the script language is JavaScript.

16. The system as recited in claim 14, wherein the script is embedded in a markup language document.

17. The system as recited in claim 14, wherein said executing the script is performed by an interpreter engine executing within a Java Virtual Machine.

18. The system as recited in claim 14, wherein the platform-independent programming language is the Java programming language, and wherein the plurality of program objects are Java programming language objects.

19. A system, comprising:

a device, comprising:
a processor;
a memory coupled to said processor and operable to store program instructions implementing a first process and a second process;

an object library comprising a plurality of program objects and accessible to processes executing within the device through an object library interface;

wherein the first process is executable within the device to:
detect one or more script language instructions in a document; and
pass execution to the second process in response to said detecting;

wherein the second process is executable within the device to:
generate a platform-independent programming language representation of the detected one or more script language instructions, wherein the platform-independent programming language representation of the one or more script language instructions is different from the script language; and
interpret and execute each of one or more instructions of the platform-independent programming language representation;

wherein, in said interpreting and executing, the second process is further executable to access one or more of the plurality of program objects in the object library through the object library interface to implement the one or more instructions of the platform-independent programming language representation;

wherein said interpreting and executing produces results in accordance with the original one or more script language instructions.

20. The system as recited in claim 19, wherein the object library and the object library interface are external to the first process and the second process.

21. The system as recited in claim 19, wherein the system further comprises a Java Virtual Machine executable within the device, and wherein the first process is a Java-based Web browser executable within the Java Virtual Machine, and wherein the second process is a JavaScript interpreter engine executable within the Java Virtual Machine.

22. The system as recited in claim 19, wherein the one or more instructions of the platform-independent programming language representation are stored in a stack data structure, wherein the interpreter engine is a stack-machine interpreter engine that pops the one or more instructions off the stack data structure during said interpreting and executing.

23. The system as recited in claim 19, wherein, in said generating a platform-independent programming language representation of the one or more script language instructions, the second process is further executable to add at least one of fields and methods to at least one of the one or more program objects.

24. The system as recited in claim 19, wherein the document is a markup language document.

25. The system as recited in claim 19, wherein the platform-independent programming language is the Java programming language.

26. The system as recited in claim 19, wherein the plurality of program objects includes Java programming language objects.

27. A system, comprising:
an object library comprising a plurality of platform-independent programming language objects;
an object library interface configured to provide access to the plurality of platform-independent programming language objects in the object library to processes within the system;
a first process configured to interpret and execute each of one or more instructions of a platform-independent programming language representation of a sequence of script language instructions, wherein the platform-independent programming language representation of the one or more script language instructions is different from the script language;
wherein, in said interpreting and executing, the first process is further configured to access one or more of the plurality of platform-independent programming objects in the object library through the object library interface to implement the one or more instructions of the platform-independent programming language representation;
wherein said interpreting and executing produces results in accordance with the sequence of script language instructions.

28. The system as recited in claim 27, wherein the first process is further configured to generate the platform-independent programming language representation from the sequence of script language instructions prior to said interpreting and executing.

29. The system as recited in claim 27, wherein the system further comprises a Java Virtual Machine, wherein the script language is JavaScript, and wherein the first process is a JavaScript interpreter executable within the Java Virtual Machine.

30. The system as recited in claim 27, wherein the platform-independent programming language is the Java programming language.

31. A carrier medium comprising program instructions, wherein the program instructions are computer-executable to implement:
detecting one or more script language instructions in a document;
generating a platform-independent programming language representation of the one or more script language instructions, wherein the platform-independent programming language representation of the one or more script language instructions is different from the script language; and
interpreting and executing each of one or more instructions of the platform-independent programming language representation, wherein said interpreting and executing comprises:
interfacing with an object library comprising a plurality of program objects; and
accessing one or more of the plurality of program objects, wherein the one or more accessed program objects are used to implement the one or more instructions of the platform-independent programming language representation;
wherein said interpreting and executing produces results in accordance with the original one or more script language instructions.

32. The carrier medium as recited in claim 31, wherein said detecting is performed by a Java-based Web browser executing within a Java Virtual Machine, wherein the script language is JavaScript, and wherein said generating, said interpreting and executing, and said interfacing with an object library are performed by a JavaScript interpreter engine executable with the Java Virtual Machine.

33. The carrier medium as recited in claim 32, wherein the JavaScript interpreter engine interfaces with the object library through an object library interface external to the Java-based Web browser and the JavaScript interpreter engine.

34. The carrier medium as recited in claim 31, wherein said generating a platform-independent programming language representation of the one or more script language instructions comprises adding at least one of fields and methods to at least one of the one or more program objects.

35. The carrier medium as recited in claim 31, wherein the platform-independent programming language is the Java programming language, and wherein the plurality of program objects includes Java programming language objects.

* * * * *